INVENTOR
HUGH E. SHAW JR.
BY
ATTORNEYS

3,510,222
Patented May 5, 1970

3,510,222
METHOD AND APPARATUS FOR MEASURING OPTICAL PROPERTIES IN THE SURFACE OF MATERIALS
Hugh E. Shaw, Jr., New Kensington, Pa., assignor to PPG Industries, Inc., a corporation of Pennsylvania
Filed Dec. 8, 1966, Ser. No. 600,090
Int. Cl. G01b 11/16; G01n 21/40; G02b 7/18
U.S. Cl. 356—33                         8 Claims

ABSTRACT OF THE DISCLOSURE

An instrument for measuring stress in the surface of a birefringent material by critical angle refractometry comprising a light source, aperture plate, prism, and telescope mounted on a common base member. The prism is attached to the base member but spaced therefrom by resilient means positioned between and bearing against the base member and prism. This permits the material contacting surface of the prism to conform to the nominal plane of the surface of the material being examined and the base member to rest on the surface being examined. An aperture plate positioned between the light source and the prism is adjustable to restrict the rays of light incident on the surface being examined to a narrow band of light rays incident at angles approximating and including the critical angle for the prism and material being examined. A split field polarized light analyzer is optically aligned with the objective and eyepiece components of the telescope and in juxtaposition with the focal plane of the eyepiece to simultaneously analyze and present for viewing components of light rays polarized in mutually perpendicular planes by the surface being examined.

---

The present invention relates to a method and apparatus for measuring optical properties in the surface layer of transparent or translucent materials. More specifically, the present invention relates to an instrument for measuring stress present in the surface layer of transparent or translucent bodies such as glass or ceramic articles.

The subject instrument, a differential surface refractometer, utilizes the principle of critical angle surface refractometry to measure stress present in the surface of glass or other articles which are optically isotropic in the unstressed state to provide a method of determining the strength of such articles without subjecting them to destructive testing.

It is known that stresses are present in the surface of non-opaque materials, such as glass, transparent glazes, and in certain high polymers. With respect to glass articles, generally there is a compressive stress layer adjacent the major surfaces of such articles and a tensile stress system interior of the compressive stress layers. Compressive stresses adjacent the surfaces of glass articles and the degree of stress present are believed to be the major factors controlling the strength of such articles. Thus, the strength of glass articles is frequently enhanced by increasing the magnitude of the compressive stress layers by chemical or thermal strengthening techniques.

This is also true for ceramic ware upon which a vitreous glaze is applied. The compressive stress present in the surface of the glaze is considered the major factor controlling the breaking strength of such articles.

Thus, there is great need for an instrument for measuring the nature and magnitude of the stresses present in the surfaces of such articles without subjecting the same to destructive testing.

In the past, a quartz wedge technique has been employed as a method of estimating the strength of flat glass articles. The quartz wedge technique involves passing a beam of light diagonally through the corner of a glass plate, parallel to its major surfaces, with polarizers and a compensator positioned in the path of the beam in the manner employed in conventional photoelastic stress measurement techniques. By this technique, the tensile stress in the interior of the glass article can be measured, and, assuming that the compressive stresses adjacent the major surfaces of the article counter balance the tensile stress, the compressive stresses can be approximated by extrapolation. However, the quartz wedge technique has certain limitations which are not particularly desirable. The technique does not provide a direct reading of compressive stress; it provides an approximation by extrapolation. Moreover, the technique is limited to approximations of the compressive stresses only in the peripheral areas of the glass article. Estimations of the compressive stress in surface areas spaced away from the corners of a glass article cannot be made by means of this technique.

Statistical quality control procedures have also been utilized commercially as a production control technique. These involve selecting a predetermined number of samples of glass from the production line and subjecting the same to destructive testing. If a sufficient number of the samples selected pass the destructive test criteria, it is presumed that the other articles produced on the same production line will be within the requisite strength requirements, at least within a certain degree of reliability. The number of production samples selected for testing and the strength requirements imposed upon those samples are set sufficiently high to insure that the remaining production samples will fall well within the requisite specifications. Such procedures, although satisfactory, are expensive in that they require that a certain number of the articles produced be destroyed.

Other instruments, in the nature of polariscopes, have been developed for measuring stresses present in a glass or other transparent article. However, most of these provide an indication of the summation of stresses present through the thickness of the glass article and do not provide a direct reading of the compressive stress layers adjacent the surfaces of such articles.

The differential surface refractometer is unique in that it provides for non-destructive measurement of the nature and magnitude of the stresses present in the surface of a birefringent material. This is achieved by means of the principles of critical angle refractometry.

Critical angle refractometry is based upon the phenomena which occurs when diverging light rays passing through a medium having a particular index of refraction impinge upon the surface of a second medium having a lower index of refraction at various angles of incidence. Depending upon the angle of incidence of the light rays impinging upon the surface of the second medium, the direction of travel of the respective light rays will change from almost total transmission (0° angle of incidence) to total reflection. This change in the direction of travel occurs because the light rays impinging upon the surface of the second medium will either be reflected or transmitted through the second medium. If the latter, the light rays will be refracted due to the different (lower) index of refraction of the second medium. As the angle of incidence of the impinging light rays increases, the angle of refraction also increases. However, because the index of refraction of the second medium is less than the index of refraction of the first medium, the angle of refraction will become 90° before the angle of incidence increases to that extent. The angle of incidence, which will produce an angle of refraction of 90°, for the light rays passing from one medium into a second medium, is the "critical angle" for those two mediums.

The critical angle $\theta_c$ for two given mediums may be found via Snell's Law:

$$n \sin \theta = n' \sin \theta'$$

where $n$ and $n'$ are respectively the indices of refraction of the first and second medium; and $\theta$ and $\theta'$ are respectively the angles of incidence and refraction; by setting $\theta'$ equal to 90° which produces the following equation:

$$\sin \theta_c = n'/n$$

where $n$ is greater than $n'$.

Light incident on the surface of the second medium at the critical angle enters the surface, is refracted by the medium, travels a short distance just under the surface in a plane parallel to the surface, and then leaves the surface, thus being totally internally reflected by the surface.

Light incident on the surface of the second medium at an angle of incidence less than the critical angle is also refracted but has an angle of refraction of less than 90° and is partially transmitted through the second medium and partially reflected back into the first medium. The portion of the light reflected increases as the angle of incidence increases from 0° to the critical angle.

Light rays incident on the surface of the second medium at angles greater than the critical angle are totally reflected at the interface of the two mediums. Thus, by illuminating the interfacing surfaces of two such mediums and observing the light reflected by the surface of the second medium, one may obtain an indication of the critical angle relationship of the mediums utilized.

With the differential surface refractometer, such observation is made by viewing a pair of illuminated fields through the eyepiece of the instrument. Light totally reflecting is observed as a bright illuminated field. The other illuminated field is somewhat darker because of the portion of the light rays refracted and transmitted through the sample being examined. This pair of illuminated fields is separated by a distinct dividing line and will be referred to as a "critical angle image."

It is important to note that the critical angle relationship exists only where the index of refraction of the first medium is greater than the index of refraction of the second medium. Furthermore, since the critical angle function is dependent upon the index of refraction of the second medium being less than the index of refraction of the first medium, when an optical fluid is interposed between the surfaces of the first and second mediums, it is important that the index of refraction of the optical fluid be intermediate the indices of refraction of the first and second mediums.

The operation of the differential surface refractometer instrument is not only based upon the principles of critical angle refractometry, but, in addition, is dependent upon stress induced birefringence in the material being examined.

It is known that certain materials such as glass, although optically isotropic in the unstressed state, become birefringent when subjected to a system of stresses. That is, the velocity of a light wave traveling through a stressed glass article would not be the same in all directions although it would be if the system of stresses were not present. More important, it is also known that the birefringence produced by stressing a glass article is directly proportional to the magnitude of the stress.

For purposes of discussion, it is convenient to represent this relationship by the following equation:

$$\sigma = C(\mu_\perp - \mu_{\|})$$

where $\sigma$ is the stress in the surface perpendicular to the plane of incidence, C is a constant of proportionality commonly called the stress-optic coefficient, and $$\mu_\perp \text{ and } \mu_{\|}$$

are the refractive indices for components of the incident light rays polarized perpendicular and parallel to the plane of incidence. The values of $$\mu_\perp \text{ and } \mu_{\|}$$

result as a consequence of the stress induced birefringent properties of the material being examined.

Using the above formula, the stress $\sigma$ may be determined if C and the difference $$(\mu_\perp - \mu_{\|})$$

are known for a particular material. The stress optic coefficient C is a constant for a given glass composition which can be calculated or determined by empirical methods. The differential surface refractometer provides an indication of the difference $$(\mu_\perp - \mu_{\|})$$

This is accomplished by observing and measuring the difference in the critical angles of refraction for components of light rays polarized perpendicular and parallel to the plane of the surface being examined. Such observation and measurement is made by observing light rays totally internally reflected by the surface being examined, i.e., light rays incident on the surface of the material being examined at the critical angle.

The differential surface refractometer comprises a light source, an optical system, i.e., a prism, for directing diverging rays of light from the source onto the surface of the material being examined, and means for observing the light rays totally internally reflected by the surface such as a reflecting mirror, telescope, and eyepiece assembly. For convenience and ease of operation, these components are usually mounted in a common housing. The present invention is concerned with improvements to such an instrument.

The light rays polarized perpendicular to and parallel with the plane of the surface being examined are observed through the eyepiece as separate critical angle images. By interposing a polarized light analyzer in the focal plane of the telescope assembly, each critical angle image can be independently observed as adjacent fields of different intensities separated by distinct dividing lines.

A polarized light analyzer is an optical device which only transmits light polarized in a particular plane. One device for analyzing or separating the components of light rays polarized in mutually-perpendicular planes is a Nicol prism. However, because of cost, shape, and mass, polarized materials which consist of a thin layer of dichloric crystals of herapathite (iodoquinine sulphate) oriented in parallel relationship and embedded in a plastic matrix are more frequently utilized. An analyzer having all of the dichloric crystals oriented in a single direction will be referred to as a uniaxial polarized light analyzer. A polarized light analyzer capable of independently transmitting both components of light rays polarized in mutually-perpendicular planes for simultaneous observation will be referred to as a dual analyzing polarized light analyzer. A split-field polarized light analyzer is a specific type of dual analyzing polarized light analyzer which will be described in detail below.

With a uniaxial polarized light analyzer, one observation is made with the axis of polarization of the analyzer normal to its position when the other observation is made. However, since two separate observations are required, the use of a uniaxial polarized light analyzer is inconvenient. Moreover, since such analyzer is not perfectly flat, an error may be introduced in the measurement when the analyzer is rotated 90° to make the second observation.

These problems may be eliminated through the use of a split-field polarized light analyzer capable of simultaneously analyzing both polarized components of the light incident on the surface being examined and presenting both critical angle images for viewing in a single observation. In a preferred embodiment, two half circles of a polarized material are prepared with their respective axes of polarization normal one to the other and laminated between two glass discs to form a split-field polarized light analyzer. The laminate structure insures that the polaroid elements are coplanar one with the other. Having the respective axes of polarization oriented normal to each other permits both observations to be made with the polarized light analyzer in one position. The light polarized perpendicular to the plane of incidence is observed in one-half of the focal plane of the telescope and the light polarized parallel to the plane of incidence is observed in the other half.

It is beneficial to restrict the diverging rays of light incident on the surface of the material being examined to a narrow band of light rays incident at angles of incidence approximating and including the critical angle for the prism and the material being examined. This has been accomplished by interposing an aperture plate between the light source and the prism.

A still further improvement to the differential surface refractometer resides in a novel method of mounting the prism to the instrument housing. Proper use of the instrument requires that one surface of the prism be placed in optical contact with the surface of the material being examined. Generally, this may be achieved by optically finishing one surface of the prism and interposing an optical fluid between the finished surface of the prism and the surface of the material being examined.

However, with a prism rigidly fixed to the housing, the instrument may have to be moved to different areas of the surface being examined before satisfactory optical contact can be attained. This may be necessary when the surface of the material being examined is irregular. With a prism rigidly fixed to the housing, such movement frequently disrupts contact with the optical fluid requiring the application of additional fluid in the area where the observation is to be made. With a rigidly fixed prism, the material contacting surface of the prism must protrude beyond the housing and is the only component of the instrument contacting the material being examined. Thus, if the instrument is used when adjustments are being made, contact with the material through the optical fluid may be broken, requiring that the steps necessary to make an observation be started anew.

These difficulties may be alleviated by mechanically attaching the prism in spaced relation to the housing and providing resilient means between the prism and the housing to maintain the spaced relation while permitting the prism to move about the mechanical attaching means. Such an arrangement permits the prism to float in such a manner that the material contacting surface of the prism will conform to the nominal plane of the surface being examined when the instrument is positioned to make an observation.

Moreover, by appropriately spacing the prism, this method of mounting the prism permits the material contacting surface of the prism to protrude beneath the material contacting surface of the housing until the instrument is properly positioned. Because of the resilient spacing means, when the instrument is properly positioned, the spacing means is compressed permitting the instrument housing to rest on the surface being examined. This provides additional contact with the surface being examined, permitting adjustments to be made without breaking optical contact between the floating prism and the surface of the material being examined.

The differential surface refractometer, its method of operation, and the various improvements thereto will be discussed in greater detail with reference to the attached drawings.

Referring now to the attached drawings which form a part of the present disclosure and wherein like reference numerals are applied to like structural elements.

The drawings illustrating the instrument and sectional views thereof show a cast aluminum housing or common base member 10, a light source assembly denoted by the numeral 20, an adjustable aperture assembly 40, a material contacting optical system 50, a mirror assembly 70, a telescope assembly 90, and a micrometer eyepiece assembly 100.

The light source assembly 20 is contained within an aluminum lamp holder 29 which is positioned in a circular opening provided in housing 10. In the light source assembly there is an incandescent lamp 21 and a standard miniature bayonet receptacle 22. Any number of commercially available radio lamps may be employed as lamp 21. A 6.3 volt, .25 amp radio lamp manufactured and marketed by the General Electric Company as Lamp No. 44 has been found to be particularly suited for use in this instrument.

Receptacle 22 is fitted within a nylon insulating sleeve 28 which is placed within lamp holder 29 and held in position by means of setscrew 30. An aluminum cap 31 is fitted into lamp holder 29. A brass rack 32 is pressed into groove 33 machined in the lateral surface of lamp holder 29.

Pinion gear 35 is engaged with rack 32. The shaft of pinion gear 35 passes through a hole provided in housing 10. By rotating a control knob, not shown in the drawings but connected to the shaft integrally formed with pinion gear 35, one may vertically adjust the position of the lamp by means of the engaged pinion gear 35 rack 32 assembly.

Figures 1, 2:
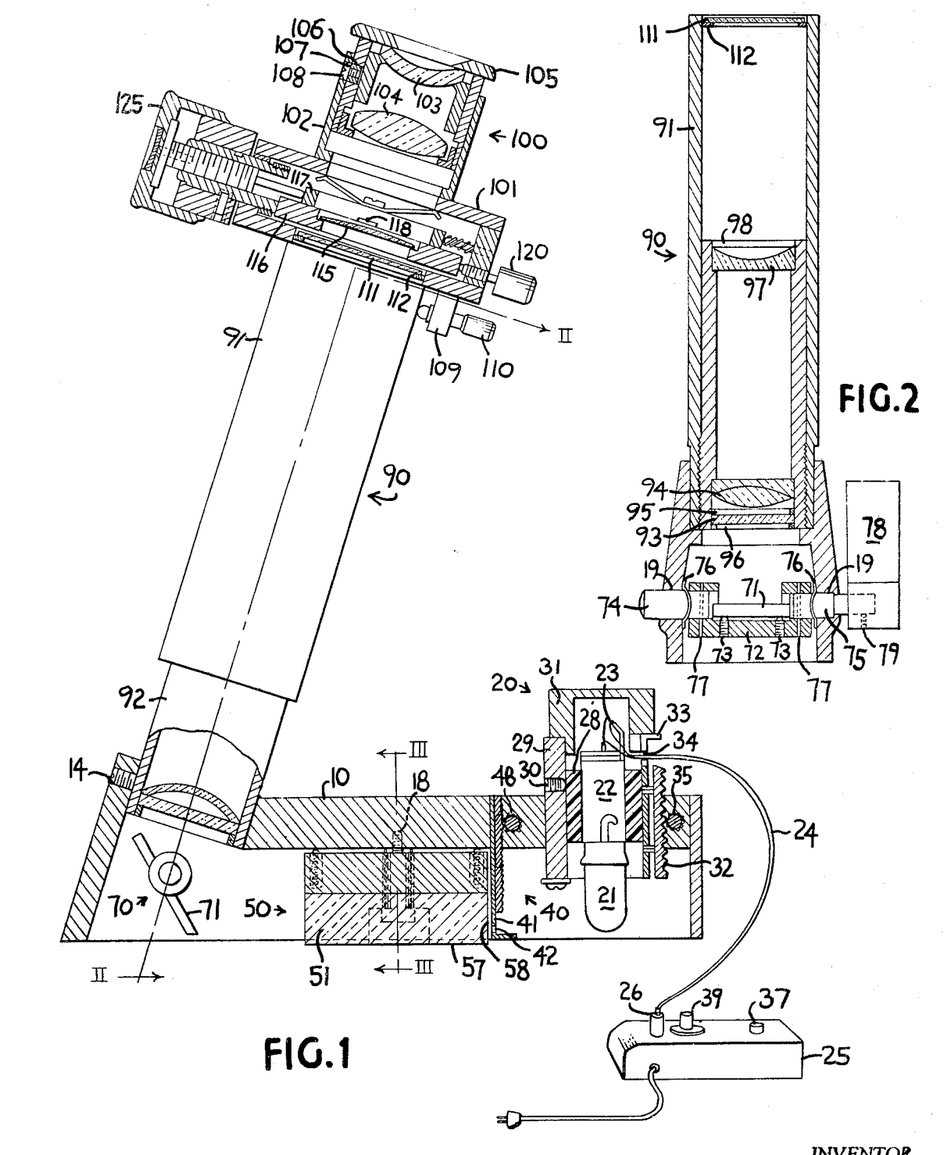
FIG. 1 is a sectional view of a differential surface refractometer.
FIG. 2 is a sectional view along line II—II of FIG. 1 illustrating further details of the construction of the instrument.

Electric current for lamp 21 is provided by means of power supply 25. As illustrated in FIG. 1, the power supply 25 is contained within a separate housing.

Figures 3, 4, 5, 6, 7, 8, 9, 10, 10A, 10B:
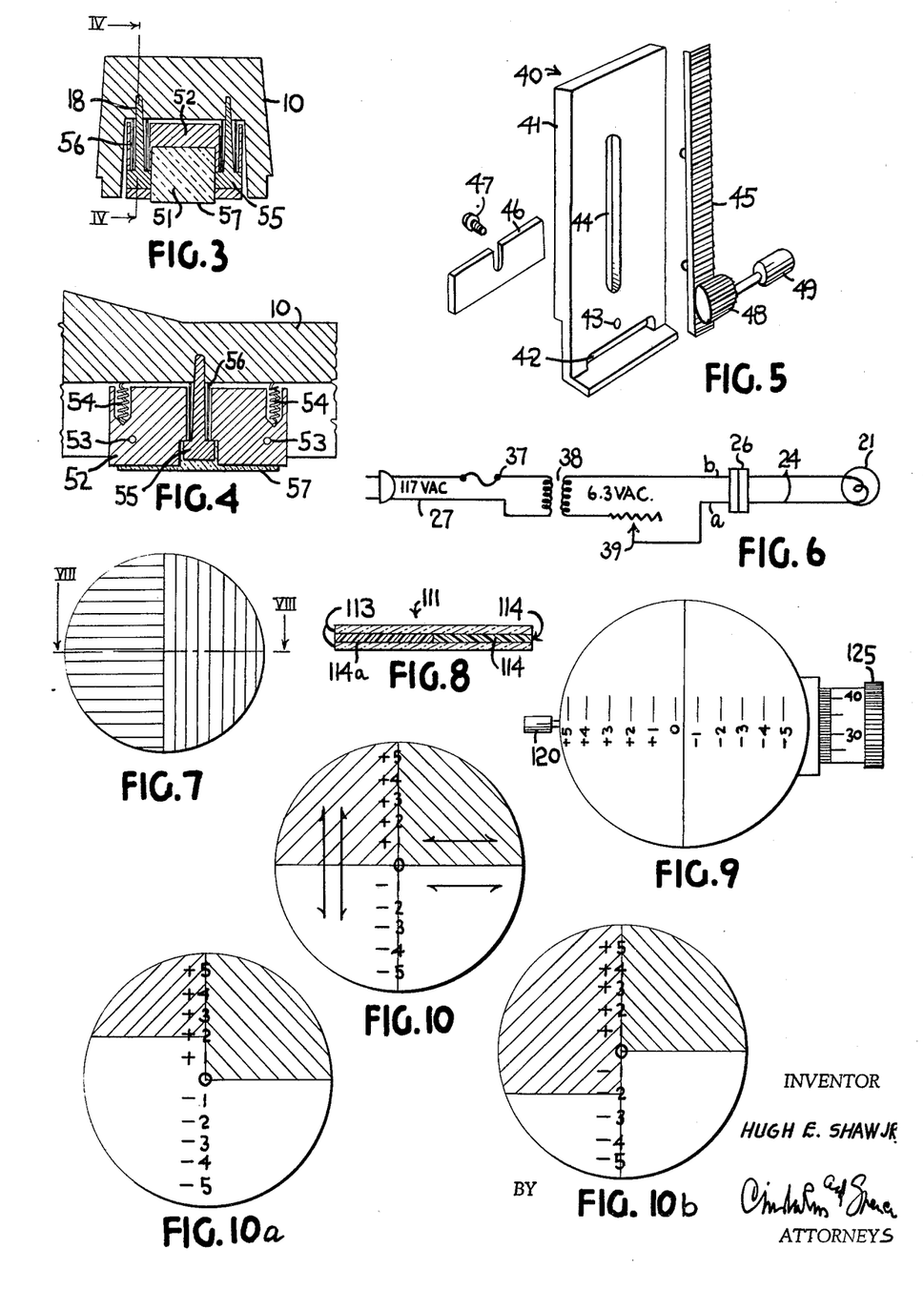
FIG. 3 is a sectional view along line III—III of FIG. 1 providing additional details of the structure of the instrument and its component parts.
FIG. 4 illustrates a further sectional view along line IV—IV of FIG. 3.
FIG. 5 is an exploded view of a component of the instrument illustrated in FIG. 1.
FIG. 6 is a schematic diagram of the circuitry employed in the power supply used in conjunction with the instrument illustrated in FIG. 1.
FIG. 7 shows a plan view of a component of the instrument illustrated in FIG. 1.
FIG. 8 is a sectional view taken along line VIII—VIII of FIG. 7.
FIG. 9 shows a plan view of the reticle scale and fiducial line of the eyepiece of the instrument illustrated in FIG. 1, as viewed through the eyepiece.
FIGS. 10, 10a, and 10b illustrate various observations which may be made on different glass samples through the use of the differential surface refractometer.

FIG. 6 is a schematic diagram of the circuitry employed in power supply 25. There is provided a ⅜ amp fuse 37, a transformer 38, and a potentiometer 39. Electrical energy is supplied to the power supply 25 by means of a common appliance cord and plug 27. The transformer 38 reduces the voltage from 117 volts, 60 cycle alternating current, to 6.3 volts, 60 cycle alternating current. The current then passes through potentiometer 39 where it may be adjusted as required during operation of the instrument. The current is supplied to lamp 21 by means of cord 24 and mechanical connector 26, which connects with wires A and B from transformer 38 and potentiometer 39. Cord 24 is introduced into the light source assembly through an opening 34 provided at the top of groove 33. Electrical connection is effected between cord 24 and receptacle 22 by soldering the wires of cord 24 to terminals 23 provided at the base of receptacle 22.

The adjustable aperture assembly, generally denoted by numeral 40 in FIG. 1, is illustrated in greater detail in FIG. 5. Referring to FIG. 5, the adjustable aperture assembly 40 has an aperture plate 41 provided with a 3/16-inch by 5/8-inch slit 42, a threaded hole 43, and a rack slot 44. The adjustable aperture plate is assembled by press fitting brass rack 45 in rack slot 44 and by fixing aperture adjusting plate 46 to aperture plate 41 by means of machine screw 47, which is threaded into hole 43. The adjustable aperture assembly is then positioned in a slot provided in housing 10. In this position, rack 45 is engaged with pinion 48. The shaft of pinion 48, formed integrally with pinion 48 passes through a hole provided in housing 10. A control knob 49, not shown in FIG. 1, is fitted on the end of the shaft of pinion 48. Pinion 48 provides support for adjustable aperture assembly 40, and by rotating control knob 49, the elevation of the aperture assembly and aperture slit 42 may be adjusted.

During assembly of the adjustable aperture plate components, the aperture adjusting plate 46 is fixed to aperture plate 41 in such a manner as to provide an optical slit measuring approximately 1/16-inch by 5/8-inch. The lamp 21 is spaced approximately 1 inch from the aperture plate 41.

The material contacting optical system, generally denoted by numeral 50 in FIG. 1, and the method of mounting the system to housing 10, is illustrated in greater detail in FIGS. 3 and 4. The material contacting optical system 50 comprises a prism 51 contained within a brass prism holder 52.

The prism 51 may be formed from any suitable glass composition. However, the index of refraction of the glass composition must be greater than the index of refraction of the material to be examined.

A prism measuring 1¾ inches by 1¾ inches by ½ inch having a refractive index of 1.541 is satisfactory for measuring stresses in commercial plate and sheet glasses having refractive indices ranging from 1.526 to 1.516.

The material contacting surface 57 of prism 51 should be machined to an optical smooth to provide good optical contact with the surface of materials being examined. Light entry surface 58 of prism 51 may be sandblasted to produce a light-diffusing surface or may be faceted or curved to cause light rays from lamp 21 to impinge upon the surface of the material to be examined in a greater range of angles of incidence. Such surfaces concentrate the light rays providing more intense images. In the alternative, a lens could be positioned intermediate the lamp 21 and prism 51 to produce the same effect.

The prism 51 is positioned within prism holder 52 by means of nylon socket head setscrews 53. Suitable holes are provided in prism holder 52 in order that the holder and prism may be attached to housing 10 by means of socket head capscrews 55, which are turned into threaded holes 18 provided in housing 10. Spacers 56, tubular sleeves, are positioned over capscrews 55 to limit the vertical movement of prism holder 52 as capscrews 55 are turned into housing 10, thereby providing a small spacing, e.g., .032-inch, between the upper surface of prism holder 52 and the internal surface of housing 10.

Four holes measuring approximately 5/16-inch deep by 3/16-inch in diameter are provided near each corner in the upper surface of prism holder 52. Springs 54, .140-inch diameter by ½-inch long (11 turns of .012-inch diameter music wire), are positioned within these holes. These springs maintain prism holder 52 in spaced relation with respect to the inner surface of housing 10. More important, when the instrument is used, these springs provide a "floating" effect to the prism holder which permits the material contacting surface 57 of prism 51 to conform to the plane of the surface of the material being examined when contact is effected between the prism and said surface.

The mirror assembly, generally denoted by the numeral 70 in FIG. 1, is illustrated in greater detail in FIG. 2. The mirror assembly consists of a mirror 71, positioned within mirror holder 72 and held in place by means of nylon socket head setscrews 73. For purposes of description, the mirror 71 in FIG. 2 has been illustrated in a position such that its major surfaces are parallel with the line of vision indicated by line II—II of FIG. 1. The mirror holder 72 is pivotably supported by housing 10 by means of mirror holder pivot pin 74 and mirror holder adjusting and pivot pin 75. Pins 74 and 75 are passed through suitable holes provided in housing 10 and mirror holder 72. Once inserted in the holes provided in mirror holder 72, pivot pins 74 and 75 are locked in place by means of self-locking steel spring pins 77. During assembly, nylon washers 76 are inserted between mirror holder 72 and housing 10 to provide a reasonably tight fit and to permit relatively easy movement of the mirror holder about the common axis of pins 74 and 75. Mirror adjusting lever 78 is positioned over the shaft extending from mirror holder adjusting and pivot pin 75 and secured in place by means of setscrew 79. With this arrangement, the mirror 71 can be pivoted about the common axis of pins 74 and 75 by manipulating mirror adjusting lever 78.

The telescope assembly, generally denoted by the numeral 90 in FIGS. 1 and 2, comprises a tube 91, a lens cell 92, and a micrometer assembly 100. Lens cell 92 is threaded into tube 91 which is positioned within an opening provided in housing 10 and held in position by setscrew 14.

Positioned within lens cell 92 are a second-order green interference filter 93 and objective components 94 and 97. Objective component 94 is an 18 mm. diameter x 80 mm. focal length coated achromat lens. Objective component 97 is an 18 mm. diameter x 80 mm. focal length negative plano-concave lens. Objective component 94 is held in place by a shoulder machined on the interior surface of lens cell 92 and is spaced from interference filter 93 by means of spacer ring 95. A retaining ring 96 locks interference filter 93 and objective component 94 in lens cell 92. Objective component 97 is held in position in lens cell 92 by means of a shoulder machined on the inner surface of the tube forming the lens cell and a retaining ring 98.

The micrometer eyepiece assembly denoted in FIG. 1 by the numeral 100, does not of itself constitute a part of the present invention. Commercially available micrometer eyepieces may be employed in conjunction with the subject instrument. A Filar micrometer eyepiece, Catalog No. 4268, produced by the American Optical Company, is well suited for use in conjunction with the subject instrument.

The micrometer eyepiece illustrated in FIG. 1 is positioned on top of tube 91 and secured in place by means of a thumbscrew 110 threaded through attaching plate 109 depending from the bottom of micrometer eyepiece housing 101. Micrometer eyepiece housing 101 contains inter alia a recticle plate 115 with a scale etched thereon, supported by reticle plate holder 116, and a ring 117, having a very fine diameter wire 118 stretched across the diameter of the ring. These components are maintained within housing 101 by springs and inter-related threaded members in such a fashion that the reticle plate holder 116 and ring 117 may be moved laterally in planes normal to the optical axis of telescope assembly 90.

For example, the reticle plate holder 116 may be moved laterally across the axis of telescope assembly 90 by rotating reticle scale adjusting thumbscrew 120. In a similar manner, the ring 117 supporting fine diameter wire 118 may be moved laterally across the optical axis of the telescope by rotating graduated micrometer drum 125. Moreover, by means of the graduations provided on micrometer drum 125 as shown in FIG. 9, the distance wire 118 traverses across the plane normal to the optical axis of the telescope may be determined.

A micrometer eyepiece barrel 102 is positioned in the upper surface of micrometer eyepiece housing 101. Eyepiece 105, positioned within barrel 102, contains magnification lens components 103 and 104. A spiral groove 106 is provided around the lateral surface of eyepiece 105. A nylon button 107 is affixed to the internal surface of eyepiece barrel 102 by means of round head machine screw 108. Nylon button 107 is engaged with spiral groove 106 to provide vertical movement to eyepiece 105 as it is rotated within eyepiece barrel 102, thereby enabling the instrument to be focused.

FIG. 9 illustrates the image observed through eyepiece 105 when it is properly focused. The ten increments of the scale etched on reticle plate 115 are shown from left to right across the face of FIG. 9. The fiducial line, i.e., the vertical line running from the top of FIG. 9 to the bottom of FIG. 9, is the image of the fine diameter wire 118 stretched across ring 117. By rotating reticle scale adjusting thumbscrew 120, the etched reticle scale seen in FIG. 9 may be moved from left to right across the field of vision. Likewise, by rotating graduated micrometer drum 125, the fiducial line may be traversed from left to right across the field of vision.

The reticle scale illustrated in FIG. 9 is 10 millimeters long and is divided into 10 equal parts of 1 millimeter each. The micrometer drum 125 moves the fiducial line 1 reticle scale division (1 millimeter) for each complete revolution of the drum. Since there is a total of 100 divisions around drum 125, each drum division equals 0.01 millimeter or 10 microns.

Referring again to FIGS. 1 and 2 positioned at the top of tube 91 within micrometer eyepiece housing 101, there is a split-field polarized light analyzer 111 held in position by means of retaining ring 112. Split-field polarized light analyzer 111 is optically aligned with and positioned intermediate eyepiece lens components 103 and 104 and telescope objective components 94 and 97. Since the eyepiece is focused on the reticle scale during operation, the preferred location for split-field polarized light analyzer 111 is adjacent the reticle scale 115 as illustrated in FIG. 1. More distinct dividing lines are observable when analyzer 111 is positioned as close as possible to the focal plane of eyepiece lens components 103 and 104. However, although sacrificing some degree of clarity, the location of the split-field polarized light analyzer 111 may be moved slightly in this general location.

Thus, the operative position for split-field polarized light analyzer 111 is in juxtaposition with the focal plane of eyepiece lens components 103 and 104. The operative position is intended to include the case where the split-field polarized light analyzer 111 is coincident with, as well as adjacent to, the focal plane of the eyepiece lens components.

A split-field polarized light analyzer is a polarized light analyzer the two halves of which are uniaxial polarizers that have been oriented at different angles. The split field polarized light analyzer 111 consists of a disc, the two halves of which are uniaxial polarized light analyzers oriented at right angles one to the other. The structure of split-field polarized light analyzer 111 is illustrated in FIGS. 7 and 8.

FIG. 7 shows a plan view of split-field polarized light analyzer 111 and FIG. 8 shows a sectional view taken along line VIII—VIII of FIG. 7. Analyzer 111 is a laminate structure comprising two outer plies of glass 113 measuring .075-inch thick by 19 millimeters in diameter, and an inner ply of a polaroid material 114. The laminate is formed by using balsam glue to hold the components together. The polaroid inner ply 114 can be formed from any suitable transparent polaroid material such as iodine crystals dispersed in plastic which is later stretched to align the crystal structure. Discs of a suitable diameter (19 millimeters) are cut from the transparent polaroid material. Two such discs are then taken and cut across their diameter. One disc is cut in a direction parallel with the direction of alignment of the iodine crystals in the polaroid. The other disc is cut in a direction perpendicular to the direction of alignment of the iodine crystals. After cutting, one-half disc having the crystal alignment therein normal to the cut edge 114a and one-half disc having the crystal alignment therein parallel to the cut edge 114b are taken together, as illustarted in FIG. 8, and employed as a single polaroid ply between the two plates of glass 113.

The foregoing consitutes a specific method of producing a split-field polarized light analyzer 111. However, it should be noted that the subject invention is not limited to the use of such an analyzer. Other methods may be employed to produce a split-field polarized light analyzer, and indeed other dual analyzing polarized light analyzers, such as Brewster's prisms, could be incorporated in the instrument to perform the same function.

Figure 11:
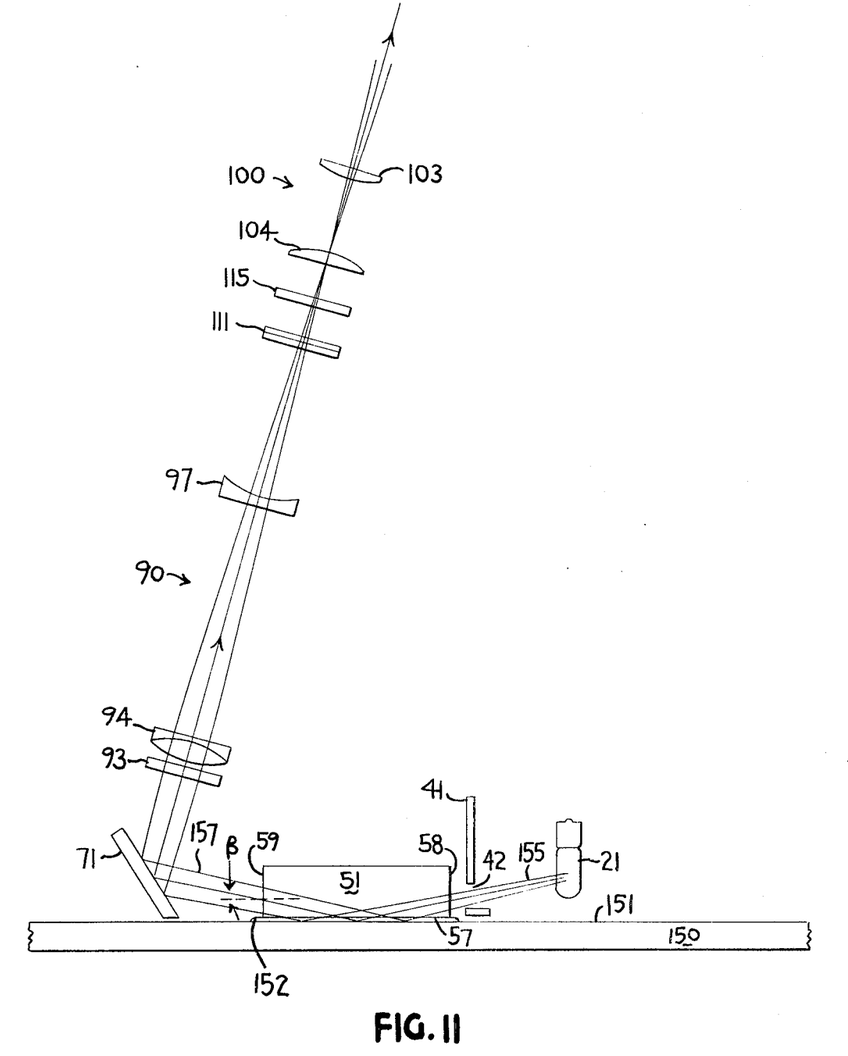
FIG. 11 is a schematic illustration of the components of the instrument of FIG. 1 placed in position to make an observation indicating the stress present in the surface of a sample.

FIG. 11 is a schematic illustration of the components of a differential surface refractometer placed in position to make an observation indicating the stress present in the surface of a sample 150, for example, a glass plate. The operation of the differential surface refractometer and the improvements thereto will now be considered.

Before the instrument is positioned to make a measurement, appropriate electrical connections are made and an optical fluid 152 is dispersed on the surface 151 in the area where surface 57 of prism 51 will make contact. Two drops of Cargille immersion liquid, a mineral oil having an index of refraction of 1.538, at a temperature of 25° C. is satisfactory for this purpose when measurements are made on most commercially-available plate and sheet glass compositions. Although any of a number of other optical fluids may be used for this purpose, as mentioned earlier, it is important that the index of refraction of the optical fluid be intermediate the indices of refraction of the prism and the material being examined.

As the instrument is positioned on glass plate 150, the springs 54 spacing prism holder 52 from instrument housing 10 permit material contacting surface 57 of prism 51 to conform to the nominal plane of the surface 151 being examined.

Moreover, although the instrument housing 10 is not shown in FIG. 11, when the instrument is positioned to make an observation, the springs 54 compress, permitting prism 51 and prism holder 52 to recede into the housing and the bottom surface of the housing 10 to rest directly on the surface 151 of the material being examined. This provides support for the instrument and permits adjustments to be made to the instrument without breaking optical contact between the floating prism and the surface of the material being examined.

Aperture assembly 40 is then adjusted by means of control knob 49 to its maximum height and potentiometer 39 is adjusted until the lamp is bright. Light source assembly 20 is adjusted by means of pinion gear 35 engaged with rack 32 until the lamp is at an intermediate height and mirror lever 78 is adjusted until a pair of critical angle images are observed in the eyepiece. The eyepiece 105 is then rotated to bring the reticle scale into sharp focus. Light source assembly 20 may again be adjusted to improve the definition of the lines dividing the two pairs of illuminated fields observable through the eyepiece.

Aperture assembly 40 is then lowered by means of control knob 49 to the position shown in FIG. 11. As the aperture assembly 40 is being lowered, the critical angle images in the eyepiece will disappear as the bottom portion of aperture plate 41 blocks the light rays 155 incident on surface 151 at the critical angle, and then reappear as the slit 42 reaches the proper position. As the image reappears, there will be greater contrast between the illuminated fields because the aperture plate 41 will block out extraneous rays of light from lamp 21.

The lamp 21 is then adjusted by means of potentiometer 39 to the level of brightness preferred by the person taking the measurement.

The theory of operation is as follows. A narrow bundle of light rays 155 emitted from lamp 21 passes through the slit 42 in aperture plate 41 and enters prism 51 through diffused light entry surface 58. The light rays are refracted by prism 51 and pass through optical contacting fluid 152 onto the surface 151 of the sample 150. At this point the light rays 155 are incident on the surface 151 at angles of incidence approximating and including the critical angle for the prism 51 and sample 150 because of the previously described adjustment of the aperture assembly 40.

Light rays 155 are either totally reflected or partially reflected and partially refracted by the surface 151, depending upon their respective angles of incidence. Those light rays 157 which are reflected by surface 151 are transmitted through optical fluid 152, re-enter prism 51, pass through the light exit surface 59 of prism 51, and are reflected by mirror 71 for observation by means of telescope assembly 90, split-field polarized light analyzer 111, and micrometer eyepiece assembly 100.

Those light rays which are incident on surface 151 at angles greater than the critical angle for prism 51 and sample 150 are totally reflected by surface 151 and observed through the eyepiece assembly 100 as a bright illuminated field. Light rays incident on surface 151 at angles less than the critical angle are also observed through the eyepiece assembly; however, the intensity of this field is greatly reduced because of the transmitted components of these light rays. The illuminated fields are separated by a distinct dividing line.

Moreover, if stresses are present in the surface 151 of glass sample 150, the light rays 157 will be polarized in mutually-perpendicular planes as they are refracted by the surface 151. Thus, although only a single bundle of rays 157 is illustrated as being reflected for observation in the telescope assembly of FIG. 11, these rays 157 comprise two separate components of light rays.

The two components have been polarized in different directions. One component has been polarized in a direction perpendicular, the other in a direction parallel, with the plane of surface 151.

This polarization results from the difference $$(\mu_\perp - \mu_\parallel)$$

previously discussed. The difference $$(\mu_\perp - \mu_\parallel)$$

is measured with the differential surface refractometer by observing the difference $$(\beta_\parallel - \beta_\perp)$$

Angle $\beta$ is illustrated in FIG. 11 as the angle formed by bundle of light rays 157 with a broken line normal to light exit surface 59 of prism 51. By mathematical analysis it can be shown that the difference $$(\beta_\parallel - \beta_\perp)$$

is proportional to the stress inducing the difference $$(\mu_\perp - \mu_\parallel)$$

The two polarized components of light rays 157 are independently analyzed by split-field polarized light analyzer 111 to simultaneously produce a pair of critical angle images in the focal plane of telescope assembly 90. This pair of images is illustrated in FIGS. 10, 10a, and 10b. In these figures the illuminated fields resulting from light polarized perpendicular to the plane of incidence is illustrated to the left of the vertical line, and, to the right, the illuminated fields resulting from light polarized parallel to the plane of incidence. The less intense illuminated fields are indicated by cross-hatching. The fiducial line is not illustrated in FIGS. 10, 10a, and 10b so as not to add confusion in the following discussion of the dividing lines between the illuminated fields.

If there is no stress present in the surface 151, the glass plate 150 would not be birefringent, both components of the bundle of light rays 157 would exit from prism surface 59 at the same angle $$(\beta_\parallel - \beta_\perp)$$

and the dividing lines of the critical angle images would coincide as shown in FIG. 10. FIG. 10a illustrates the relative positions of the dividing lines for the adjacent critical angle images when compressive stresses are present in the surface 151. FIG. 10b illustrates the relative positions of the dividing lines when the surface is in tension.

More important, however, the separation between the dividing lines in FIG. 10a or 10b may be observed in terms of reticle scale units which when compared with a conversion chart indicate the magnitude of the stress present.

The table sets forth a conversion chart that has been prepared for use with differential surface refractometer measurements made on sheet glass.

A conversion chart such as that of the table must be prepared for each prism to be used with each type of material to be examined. The table has been prepared for reference when a barium crown prism having an index of refraction of 1.5410 and dispersion value of 59.9 (Optical Glass Code LBC541599) is used in the instrument to measure the stress present in sheet glass having a stress-optic coefficient of 2.31 pounds per square inch per mu per inch.

TABLE

| Reticle Scale Units | Stress (p.s.i.) | Reticle Scale Units | Stress (p.s.i.) | Reticle Scale Units | Stress (p.s.i.) |
|---|---|---|---|---|---|
| 0.1 | 522 | 3.5 | 18,270 | 6.8 | 35,496 |
| 0.2 | 1,004 | 3.6 | 18,792 | 6.9 | 36,018 |
| 0.3 | 1,566 | 3.7 | 19,314 | 7.0 | 36,540 |
| 0.4 | 2,088 | 3.8 | 19,836 | 7.1 | 37,062 |
| 0.5 | 2,610 | 3.9 | 20,358 | 7.2 | 37,584 |
| 0.6 | 3,132 | 4.0 | 20,880 | 7.3 | 38,106 |
| 0.7 | 3,654 | 4.1 | 21,402 | 7.4 | 38,628 |
| 0.8 | 4,176 | 4.2 | 21,924 | 7.5 | 39,150 |
| 0.9 | 4,698 | 4.3 | 22,446 | 7.6 | 39,672 |
| 1.0 | 5,220 | 4.4 | 22,968 | 7.7 | 40,194 |
| 1.1 | 5,742 | 4.5 | 23,490 | 7.8 | 40,716 |
| 1.2 | 6,264 | 4.6 | 24,012 | 7.9 | 41,238 |
| 1.3 | 6,786 | 4.7 | 24,534 | 8.0 | 41,760 |
| 1.4 | 7,308 | 4.8 | 25,056 | 8.1 | 42,282 |
| 1.5 | 7,830 | 4.9 | 25,578 | 8.2 | 42,804 |
| 1.6 | 8,352 | 5.0 | 26,100 | 8.3 | 43,326 |
| 1.7 | 8,874 | 5.1 | 26,622 | 8.4 | 43,848 |
| 1.8 | 9,396 | 5.2 | 27,144 | 8.5 | 44,370 |
| 1.9 | 9,918 | 5.3 | 27,666 | 8.6 | 44,892 |
| 2.0 | 19,440 | 5.4 | 28,188 | 8.7 | 45,414 |
| 2.1 | 10,962 | 5.5 | 28,710 | 8.8 | 45,936 |
| 2.2 | 11,484 | 5.6 | 29,232 | 8.9 | 46,458 |
| 2.3 | 12,006 | 5.7 | 29,759 | 9.0 | 46,980 |
| 2.4 | 12,528 | 5.8 | 30,276 | 9.1 | 47,502 |
| 2.5 | 13,050 | 5.9 | 30,798 | 9.2 | 48,024 |
| 2.6 | 13,572 | 6.0 | 31,320 | 9.3 | 48,546 |
| 2.7 | 14,094 | 6.1 | 31,842 | 9.4 | 49,068 |
| 2.8 | 14,616 | 6.2 | 32,364 | 9.5 | 49,590 |
| 2.9 | 15,138 | 6.3 | 32,886 | 9.6 | 50,112 |
| 3.0 | 15,660 | 6.4 | 33,408 | 9.7 | 50,634 |
| 3.1 | 16,182 | 6.5 | 33,930 | 9.8 | 51,156 |
| 3.2 | 16,704 | 6.6 | 34,452 | 9.9 | 51,678 |
| 3.3 | 17,226 | 6.7 | 34,974 | 10.0 | 52,220 |
| 3.4 | 17,748 | | | | |

Empirically, each prism can be calibrated by subjecting a plate of glass of a particular composition and a known initial stress to controlled beam loading in such a manner that a uniaxial tensile stress opposes the compressive stress in the surface of the plate. The instrument oriented perpendicular to the applied stress is then placed on the surface and the separation between the dividing lines observable in eyepiece 100 is measured in terms of the reticle scale divisions illustrated in FIG. 9. These measurements are then plotted against each increment of stress applied to produce a curve which can be utilized in conjunction with subsequent measurements made on the same type of material or to tabulate a conversion chart such as that illustrated in the table.

Thus, referring to FIG. 10a and observing that the dividing lines for the adjacent critical angle images are separated a distance of two reticle scale units, and referring to the table, it is apparent that the surface being examined is subjected to a compressive stress of 10,440 pounds per square inch.

When measurements are made with the differential surface refractometer, the reticle scale is laterally positioned to align one of the divisions, preferably zero, with one of the dividing lines by means of the thumbscrew 120. The number of whole reticle scale units separating the dividing lines can be counted and any remaining fractional portion can be measured by adjusting the fiducial line to coincide with the other dividing line by means of micrometer drum 125. Each division on micrometer drum 125 is equal to .01 reticle scale units.

The advantage offered by the split-field polarized light analyzer can now be readily appreciated. With a rotating uniaxial linear polarized light analyzer, the analyzer would be rotated to the proper position to view one critical angle image and the reticle scale reading for the dividing line would be recorded. The analyzer would then be rotated 90° to view the other critical angle image and record the reticle scale reading for the other dividing line. If the analyzer is not perfectly flat or the rotating mechanism varies the plane of the analyzer, an error would be introduced into one of the readings. Such an error, although small, may nevertheless be significant because the difference $$(\beta_{\parallel} - \beta_{\perp})$$

being measured is quite small.

If the rotary movement of the uniaxial linear polarized light analyzer is not carefully made, it may affect the settings of other components of the instrument or shift the location of the prism on the surface being examined. If either of these are observed, the initial reading should be repeated. If not observed, an error may result in the measurement being made.

In addition, the two readings made with a rotating uniaxial linear polarized light analyzer have to be subtracted and the difference compared with a conversion chart. This introduces the possibility of arithmetical error.

There is still a further advantage obtained through the use of the split-field polarized light analyzer 111. This rests in the ease and convenience of measuring the stress in the surface of transparent or translucent articles with the instrument described above. Although the differential surface refractometer is a very precise instrument, stress measurements may be made quickly, with relative ease, and great reliability, through the use of a split-field polarized light analyzer which presents both critical angle images for viewing and measurement in a single observation.

What is claimed is:

1. An instrument for measuring stress in the surface of a birefringent material by observing the critical angle relationship of said material with a second material comprising:

a light source emitting rays of light, a prism constituting said second material and serving to direct said rays of light from said source onto a surface of the material being examined at varying angles of incidence, said prism having a finished surface for effecting optical contact with said surface of the material being examined, means for observing light rays from said source incident on said surface of the material being examined at angles of incidence approximating and including the critical angle of incidence for said prism and said material being examined, a common base member supporting said light source, said prism, and said means for observing said light rays, means attaching said prism to said common base member, and resilient means intermediate said prism and said common base member so that said finished surface of said prism is adjustable to the nominal plane of said surface of said material being examined.

2. The instrument of claim 1 wherein the means for attaching said prism to said common base member is a prism holder attached to the base member by cap screws and maintained in spaced movable relationship with said common base member by compressed springs positioned in holes provided in said prism holder and bearing against a surface of said common base member.

3. An instrument for measuring stress in the surface of a birefringent material by observing the difference in refraction for light rays incident on said surface and polarized in mutually-perpendicular planes by said surface comprising:

a light source emitting rays of light, a prism for directing rays of light from said source onto said surface of the material being examined at at plurality of angles of incidence, including the critical angle of incidence for said prism and said material being examined, means for receiving and observing said light rays polarized in mutually-perpendicular planes, and a dual analyzing polarized light analyzer optically aligned with said means for receiving and observing said light rays, to independently analyze said light rays polarized in mutually-perpendicular planes and simultaneously present the same for viewing in a single observation.

4. The apparatus of claim 3 wherein said means for analyzing said light rays polarized in mutually-perpendicular planes independently one from the other for viewing in a single observation comprises a split-field polarized light analyzer optically aligned with said objective and eyepiece components and in juxtaposition with the focal plane of said eyepiece.

5. An instrument for measuring stress in the surface of a birefringent material by critical angle refractometry comprising, a light source emitting rays of light, a prism for directing said rays of light onto the surface of the material to be examined, said prism having an index of refraction greater than the index of refraction of said birefringent material, a plate provided with an aperture, said plate positioned intermediate said light source and said prism and adjustable to align said aperture with said light source and said prism to pass rays of light incident on said surface being examined at angles of incidence approximating and including the critical angle for said prism and said birefringent material, and means for observing the said rays of light incident on said surface at said angles of incidence approximating and including the said critical angle.

6. An instrument for measuring stress in the surface of glass by observing the difference in refraction of light rays incident on said glass surface and polarized by said glass surface in mutually-perpendicular planes comprising:

a light source emitting rays of light, a prism for directing said diverging rays of light onto said glass surface at a plurality of angles of incidence including the critical angle of incidence for said prism and said glass, said prism having an index of refraction greater than the index of refraction of said glass, a plate provided with an aperture, said plate positioned intermediate said light source and said prism and adjustable to align said aperture with said light source and said prism to pass rays of light incident on said glass surface at angles of incidence approximating and including the critical angle for said prism and said glass,